United States Patent
Behm

(10) Patent No.: US 12,102,263 B2
(45) Date of Patent: Oct. 1, 2024

(54) SMALL-BATCH COFFEE BEAN ROASTER AND COUNTER-TOP OVEN APPLIANCE

(76) Inventor: Joseph Behm, San Diego, CA (US)

(*) Notice: Subject to any disclaimer, the term of this patent is extended or adjusted under 35 U.S.C. 154(b) by 6503 days.

(21) Appl. No.: 10/492,284

(22) PCT Filed: Oct. 10, 2002

(86) PCT No.: PCT/US02/32395
§ 371 (c)(1),
(2), (4) Date: Apr. 9, 2004

(87) PCT Pub. No.: WO03/031893
PCT Pub. Date: Apr. 17, 2003

(65) Prior Publication Data
US 2005/0072018 A1     Apr. 7, 2005

Related U.S. Application Data

(60) Provisional application No. 60/328,158, filed on Oct. 10, 2001.

(51) Int. Cl.
*A47J 37/06* (2006.01)
*A23N 12/10* (2006.01)
*A47J 37/04* (2006.01)

(52) U.S. Cl.
CPC .......... *A47J 37/0641* (2013.01); *A23N 12/10* (2013.01); *A47J 37/041* (2013.01); *A47J 37/047* (2013.01); *A47J 37/0623* (2013.01)

(58) Field of Classification Search
CPC ...... A47J 37/041; A47J 31/042; A47J 31/047; A47J 31/0641
USPC .............................. 99/473, 474, 477; 34/139
See application file for complete search history.

(56) References Cited

U.S. PATENT DOCUMENTS

| | | | | |
|---|---|---|---|---|
| 2,969,450 | A | * | 1/1961 | Bernstein ............ A47J 37/0623 |
| | | | | 219/400 |
| 4,010,341 | A | | 3/1977 | Ishammar |
| 4,325,191 | A | * | 4/1982 | Kumagai ............... A23N 12/12 |
| | | | | 34/571 |
| 4,484,064 | A | | 11/1984 | Murray |
| 4,494,314 | A | | 1/1985 | Gell, Jr. |
| 4,860,461 | A | * | 8/1989 | Tamaki .................. A23N 12/10 |
| | | | | 34/267 |

(Continued)

FOREIGN PATENT DOCUMENTS

| | | |
|---|---|---|
| WO | WO 97/16985 | 5/1997 |
| WO | WO 99/23888 | 5/1999 |

OTHER PUBLICATIONS

Material on Fresh Roast Plus http://www.sweetmarias.com/prod.freshroast.shtml http://www.coffeebeancorral.com/Productinfo.aspx?productid=FR http://www.coffeeproject.com/roast.

(Continued)

*Primary Examiner* — Reginald Alexander
(74) *Attorney, Agent, or Firm* — D. Whitlow Bivens

(57) ABSTRACT

A countertop appliance and coffee roaster (10) with a roasting chamber containing at least one heating element (30), a bean container (12), and an exhaust duct (22) for venting said roasting chamber. The countertop appliance and coffee roaster (10) may include a cooling duct (42) for cooling the beans at the conclusion of the roasting cycle. The exhaust duct (22) may contain an exhaust fan (72), secondary heating elements (74), and/or exhaust duct vents (20).

11 Claims, 4 Drawing Sheets

(56) References Cited

U.S. PATENT DOCUMENTS

| | | | |
|---|---|---|---|
| 4,860,641 A | 8/1989 | Spears | |
| 4,865,864 A * | 9/1989 | Rijswijck | F24C 15/322 |
| | | | 219/400 |
| 4,871,901 A | 10/1989 | Igusa | |
| 5,182,981 A | 2/1993 | Wilcox | |
| 5,193,444 A | 3/1993 | Bar-Sheshet | |
| 5,230,281 A | 7/1993 | Wireman | |
| 5,269,072 A | 12/1993 | Waligorski | |
| 5,378,060 A | 1/1995 | Brock et al. | |
| 5,387,256 A | 2/1995 | Enomoto | |
| 5,564,331 A | 10/1996 | Song | |
| 5,638,607 A | 6/1997 | Lemme et al. | |
| 5,890,418 A | 4/1999 | Song | |
| 5,928,697 A | 7/1999 | Felip | |
| 5,943,790 A | 8/1999 | Gell, Jr. | |
| 5,944,512 A | 8/1999 | Ludwig | |
| 5,994,672 A * | 11/1999 | Mestnik | F24C 15/2014 |
| | | | 219/400 |
| 6,036,988 A | 3/2000 | Lemme et al. | |
| 6,065,226 A | 5/2000 | Gell, Jr. | |
| 6,076,453 A | 6/2000 | Hsu | |
| 6,112,644 A | 9/2000 | Song | |
| 6,142,064 A | 11/2000 | Backus et al. | |
| 6,220,152 B1 | 4/2001 | Baldwin et al. | |
| 6,250,207 B1 | 6/2001 | Hansen | |
| 6,279,462 B1 | 8/2001 | Kim | |
| 6,382,087 B1 | 5/2002 | Liyama | |
| 6,558,726 B2 | 5/2003 | Erickson et al. | |
| 2001/0001349 A1 | 5/2001 | Moon et al. | |
| 2002/0164409 A1 | 11/2002 | Sandolo | |

OTHER PUBLICATIONS

Material on Swissmar Alpenrost http://www.sweetmarias.com/prod.swissmar-alpenrost.shtml http://www.coffeeproject.com/roasters/alpenrost.html.

Material on Zach and Dani's http://www.sweetmarias.com/prod.ZachandDanis.shtml.

Material on HoTTop Drum Roaster http://www.sweetmarias.com/prod.hottop.shtml http://www.coffeebeancorral.com/ProductInfo.aspx?productid=Hottop.

Material on Hearthware I-Roast http://www.sweetmarias.com/prod.hearthwareiRoast.shtml http://www.coffeebeancorral.com/ProductInfo.aspx?productid=HWIroast.

Material on Caffee Rosto http://coffeeproject.com/roasters/cafferosto.html.

Material on Cafe Roaster http://www.sonofresco.com/ http://www.sweetmarias.com/prod.coffeekinetics.shtml.

\* cited by examiner

SMALL-BATCH COFFEE BEAN ROASTER AND COUNTER-TOP OVEN APPLIANCE

This is a national stage application filed under 35 U.S.C. 371 of International Application No. PCT/US02/32395 which was published in English on Apr. 17, 2003 under PCT Article 21(2) and claimed priority to and the benefit of U.S. Provisional Application No. 60/328,158 filed Oct. 10, 2001.

TECHNICAL FIELD

This invention relates to home appliances used for food and/or beverage preparation. More specifically, the invention relates to home appliances that may be used for multiple different purposes. Most specifically, the invention relates to a home appliance for roasting coffee beans.

BACKGROUND ART

Several examples of small-batch coffee roasters intended for home use are shown in the prior art. Examples include U.S. Pat. Nos. 4,484,064; 4,494,314; 5,359,788; 5,943,790; and 6,065,226. Each of those roasters rely on the principle of roasting beans by forcing heated air through a fluidized bed of coffee beans. Such technology is similar to hot-air based popcorn poppers.

U.S. Pat. No. 5,928,697 (the "'697 Patent") discloses a coffee roaster designed to roast coffee beans in commercial quantities. The '697 patent also relies on heated gas to accomplish the roasting of the beans. In addition, the '697 patent discloses (i) eliminating solid particulates from the exhaust gases in a cyclone separator; (ii) splitting the exhaust gases into a recycle stream and an exhaust stream; (iii) directing the recycle stream back into the combustion chamber that produces the roasting gases; (iv) directing the exhaust stream to a secondary combustion chamber in which they are further combusted; and (v) venting the exhaust stream or treating the exhaust stream with a catalytic converter and then venting the exhaust stream.

U.S. Pat. No. 5,632,098 discloses a system for roasting coffee beans inside a rotating cylindrical tubular member positioned over a barbecue grill. U.S. Pat. No. 5,771,600 discloses a drum attachment to a existing rotisserie within an oven or over a grill for roasting coffee beans. U.S. Pat. No. 6,220,152 discloses a barbeque rotisserie enclosure.

U.S. Pat. Nos. 2,705,450; 6,076,453; 6,142,064; 78; and 6,279,462 all disclose countertop rotisserie ovens.

None of the foregoing prior art, alone or in combination, discloses or suggests the present invention.

DISCLOSURE OF INVENTION

The gourmet coffee industry has been and is the fastest growing segment of the food processing industry in the last few years. The present invention brings to consumers the ability to roast coffee in their homes in an efficient and economical way. The preferred embodiment of this invention enables gourmet coffee drinkers to purchase unroasted or green coffee beans and roast the beans themselves thus cutting their costs by as much as 50% and enjoy even fresher coffee. For those who buy canned coffee they now can enjoy fresh gourmet coffee for mere pennies more than they are currently paying.

The present invention may also act as a toaster, broiler, and small oven and may also lend itself to be the basis for many household kitchen appliances that require a motor. Thus, the present invention provides a unique, cost effective, utilitarian household appliance geared toward individual consumers, as well as small commercial ventures, such as donut shops, small bakeries, coffee shops, and restaurants.

The present invention, in its preferred embodiments, provides a for a home appliance specially adapted for roasting coffee beans. In one preferred embodiment, the coffee roasting oven is a rectilinear cube-like structure containing heating elements optimally placed to maximize the roasting efficiency and quality of the roast. Those elements may be made from any suitable material capable of heating to 100-550+ degrees Fahrenheit.

The coffee beans preferably are contained in a cylindrical drum or other container made of metal mesh, perforated metal or any other suitable material. The drum or container is adapted to be opened to allow green coffee beans to be placed inside and to allow roasted beans to be extracted. For example, but without limitation, one or both ends of the drum or container may be removable. Alternatively, a hatch may be placed in a wall of the drum or container. The drum or container and the roaster are adapted to engage each other in a manner whereby the drum or container containing the beans may be rotated proximate to one or more of the heating elements. For example, but without limitation, the drum or container may be fitted with an axle adapted to be removably received by a rotatable receiving socket or other receiving element within the coffee roaster. Once installed, rotation of the receiving socket or other receiving element may cause rotation of the drum or container. The receiving socket or other receiving element may be operably connected through any known means to a motor within the coffee roaster.

A second alternative, given without intent to limit the invention, may be to fit the drum or container with gear teeth around the perimeter of the drum or container. A third alternative, given without intent to limit the invention, is to attach a gear to the drum or container or to an axle attached to the drum or container. In either case, the gear teeth may be adapted to engage a drive gear attached to a motor when the drum or container is placed within the coffee roaster. In the second and third examples, the drum or container may rest on stub axles adapted to be received by the interior of the coffee roaster and to be freely rotatable within said interior.

In operation, green coffee beans are poured into the container or drum, the container or drum is closed and placed into the coffee roaster. The roaster is then turned on causing rotation of the coffee beans in the container proximate to one or more heating elements.

The roaster preferably incorporates one or more fans such as a cooling fan, air circulation fan and/or exhaust fan for optimal roasting and cooling. In one preferred embodiment, the roaster incorporates two fans and appropriate ducts to minimize any smoke emitted during the roasting process and to rapidly cool the beans at the conclusion of the roasting process.

The first fan draws hot air, smoke and other gases generated during the roasting process through a vent in the top of the roasting chamber and into an exhaust duct. The fan may be located within the exhaust duct itself. Incorporation of such a fan and ducting "pulling" the air from the roasting chamber is highly effective for collecting smoke generated by the roasting and cooling process.

An additional preferred feature is the incorporation of secondary heating elements located within the duct. When the secondary heating elements are heated to at least 300° C. and preferably over 350° C., the amount of smoke emitted from the roaster is dramatically reduced. The secondary heating elements may be made from filaments or any other suitable material.

The second fan of the preferred embodiment may be combined with appropriate ducts to direct ambient air at the beans in the container at the conclusion of the roasting process when the beans are being cooled.

In addition, the roaster may be fitted with a filtering device to filter the exhaust from the roaster to minimizing the amount of smoke emitted during the roasting and cooling process. Such a feature may be used alone or in combination with the secondary heating elements. The filter may be a high efficiency particle air ("HEPA") type filter, ionized type filter, electrostatic type filter, active carbon type filter, carbon composite type filter, charcoal filter or any other suitable filter.

An additional preferred feature functions to cool the exhaust from the roaster to a temperature that is acceptable for home countertop use. One method of accomplishing such a goal is to incorporate vents to the ambient air into the exhaust duct. It is believed that when hot air and gases are actively driven down the exhaust vent by the first fan, ambient air is taken in through passive vents in the exhaust duct. The ambient air dramatically reduces the temperature of the exhaust. Alternatively, a fan may be used to "push" ambient air into one or more of such exhaust duct vents.

One additional feature that may be incorporated is a variable speed motor which can be the basis for affixing many attachments, including but not limited to a coffee bean grinder, food blender, food processor, food slicer, fruit and/or vegetable juicer, cheese grater, meat grinder, shake mixer or any other motorized kitchen appliance. The motor may be the same motor that causes the rotation of the drum or bean container or the motor may be a second motor incorporated within the coffee roaster housing. The coffee roaster and various attachments may be adapted to allow the attachments to be attached to the coffee roaster whereby the motor runs the operative portion or portions of the attachments.

BEST MODE FOR CARRYING OUT THE INVENTION

The following description is of the best presently contemplated modes of carrying out the subject invention. This description is made for the purpose of illustrating the general principles of the invention and should not be taken in a limiting sense. Additional details of the best presently contemplated modes of carrying out the subject invention may be found throughout this disclosure.

Figure 1:
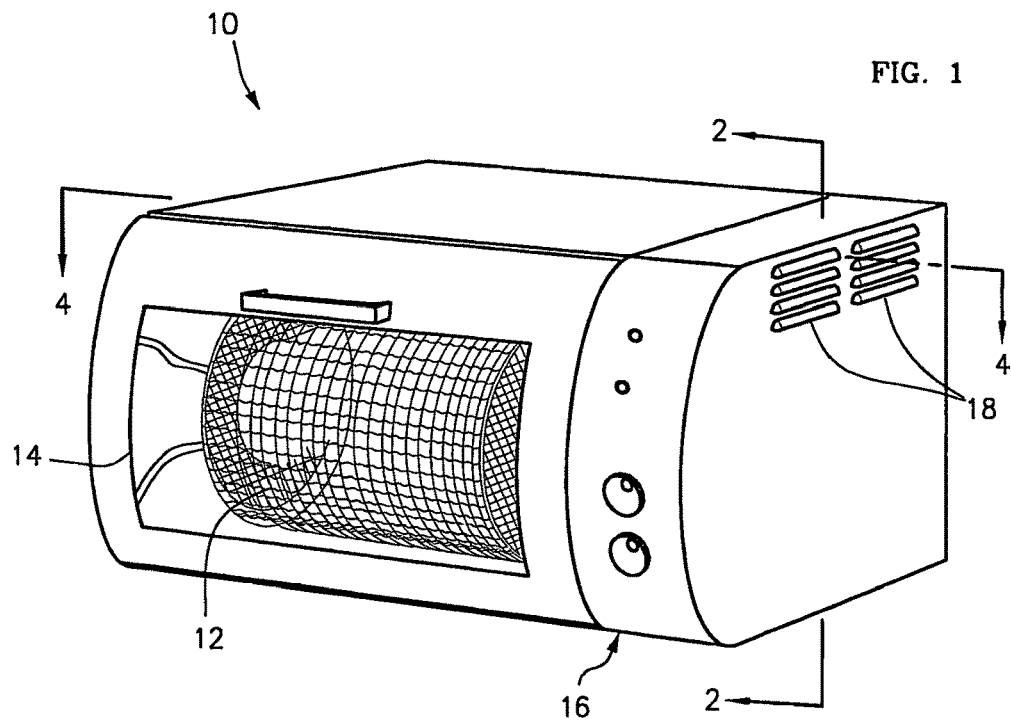
FIG. 1 is a perspective view of the exterior of one possible embodiment of the countertop coffee roaster invention.

In accordance with the present invention, FIG. 1 shows a perspective view of the exterior of the coffee roaster designated generally as 10. The roasting drum 12 installed in the roasting chamber is visible through front window 14. Roasting drum 12 may be provided with internal fins or other protrusions (not shown) to stir the coffee beans during the roasting and cooling process. A control panel is generally designated as 16 and is further described below. Vents 18 allow ambient air access to vents 20 (shown in FIGS. 4 and 5) in exhaust duct 22 (shown in FIGS. 2, 4, and 5).

Figure 2:
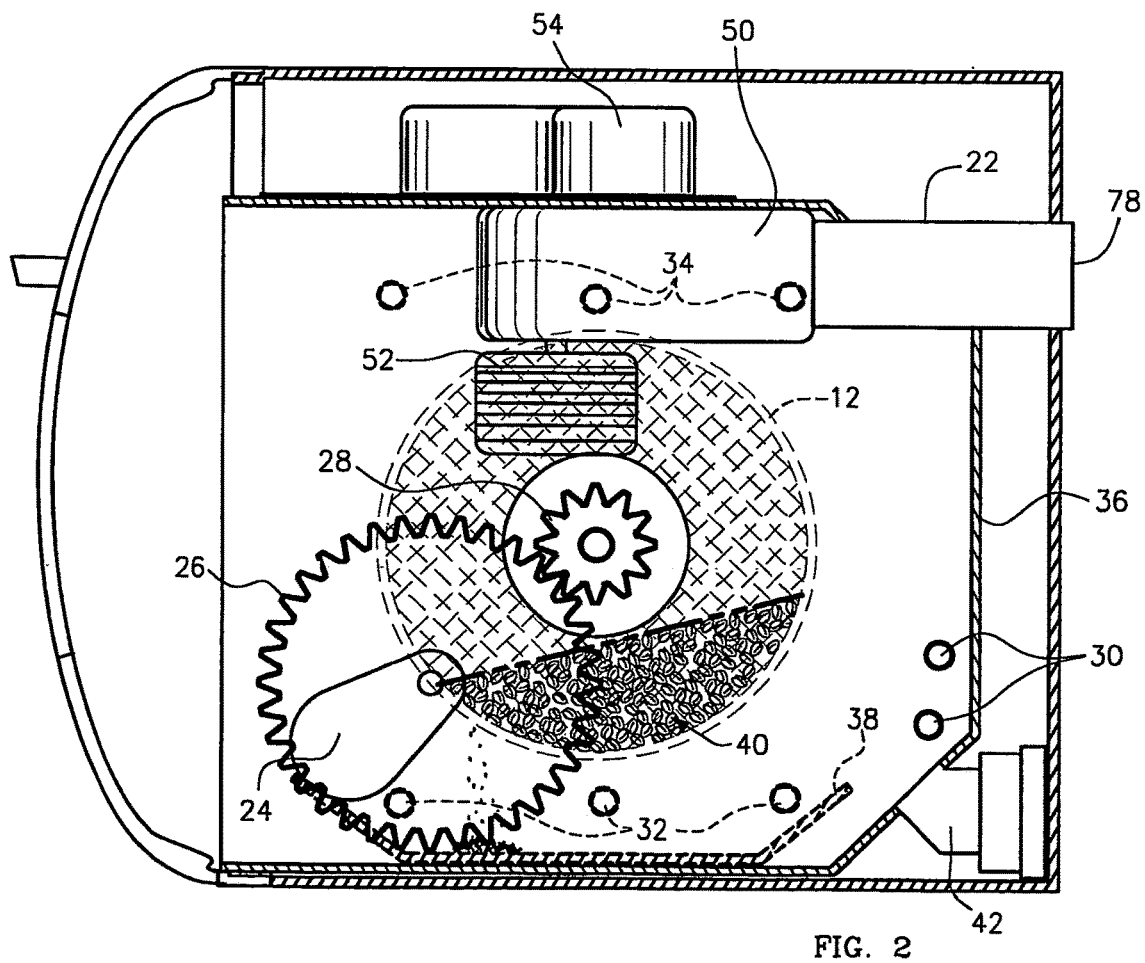
FIG. 2 is a cross-sectional view taken along line 2-2 of FIG. 1 showing the interior of one possible embodiment of the countertop coffee roaster invention.

FIG. 2 shows a cross-sectional view of the interior of coffee roaster 10. As seen in FIG. 2, motor 24 turns drive gear 26 which meshes with gear 28. Gear 28 is attached to drum 12. Drive gear 26 and gear 28 are sized so that when motor 24 is activated, drum 12 rotates at 6-13 RPM. Failure to rotate drum 12 at 6-13 RPM may cause tipping of the beans or lead to a poor quality roast that may be uneven.

FIG. 2 also shows one possible arrangement of heating elements 30, 32, and 34. The heating elements 30, 32, and 34 may be made of quartz or any other like material capable of reaching temperatures of 100-550+ degrees Fahrenheit. As shown in FIG. 2, the heating elements 30, 32 and 34 may be arranged in three sets with one set 34 located on the top of the roasting chamber of coffee roaster 10, one set 32 located on the bottom of the roasting chamber and one set 30 located towards the bottom of back wall 36. Each set of elements may consist of one or more individual heating elements. Heating elements 30 are specifically designed and located for roasting the coffee. Heating elements 32 and 34 are designed and located to allow the unit to be used for functions other than roasting coffee such as broiling, toasting and baking. Preferably, each set of elements may be turned on or off independent of the state of the other two sets of elements to facilitate the many different cooking, roasting, broiling, toasting and baking tasks that the invention may perform.

As mentioned previously, heating elements 30 are specifically designed and located to facilitate the roasting of coffee. When coffee beans are roasted, a paper-like particle called chaff is produced. During roasting, the chaff will fall from the drum 12 directly downward. If desired, a removable chaff and crumb collector 38 may be positioned underneath drum 12.

If chaff lands on or near a hot element, massive amounts of smoke may be generated. That problem is avoided by locating elements 30 along the lower portion back wall 36 away from the chaff. In addition, when drum 12 is turning during the roasting process, rather than laying flat along the bottom of drum 12, the beans 40 are carried part way up the interior wall of drum 12 in the direction of rotation as shown in FIG. 2. Thus elements 30 are positioned close to beans 40 to maximize the roasting efficiency of the coffee roaster. To further increase the roasting efficiency, back wall 36 may be provided with a reflective liner that may be contoured to maximize the heat transmission from elements 30 onto beans 40. The reflective liner may be permanently attached to the coffee roaster or may be removable to facilitate easy cleaning. The reflective liner may be made of stainless steel, other metal or any other suitable material.

Figure 3:
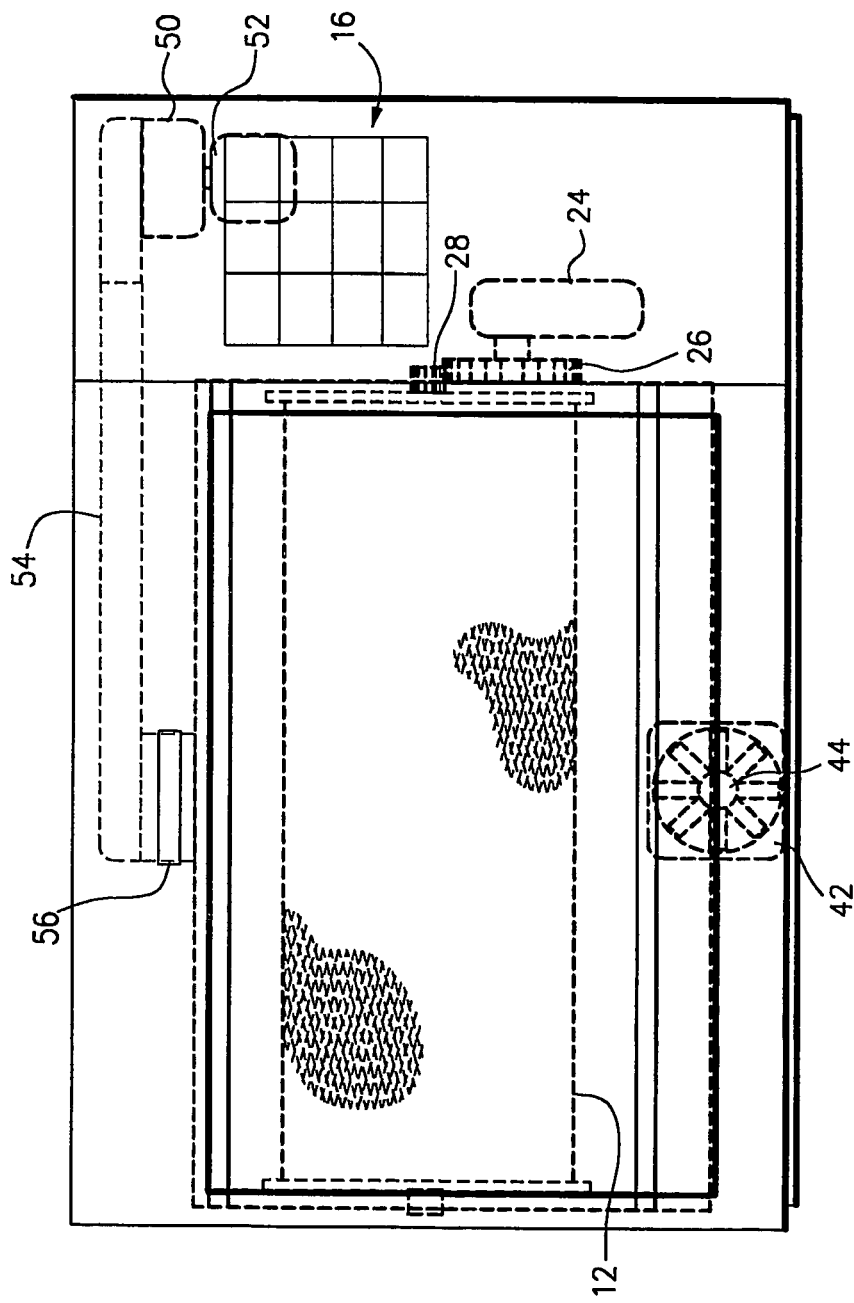
FIG. 3 is a front view of one possible embodiment of the countertop coffee roaster invention showing one possible position of several internal components.
Figure 4:
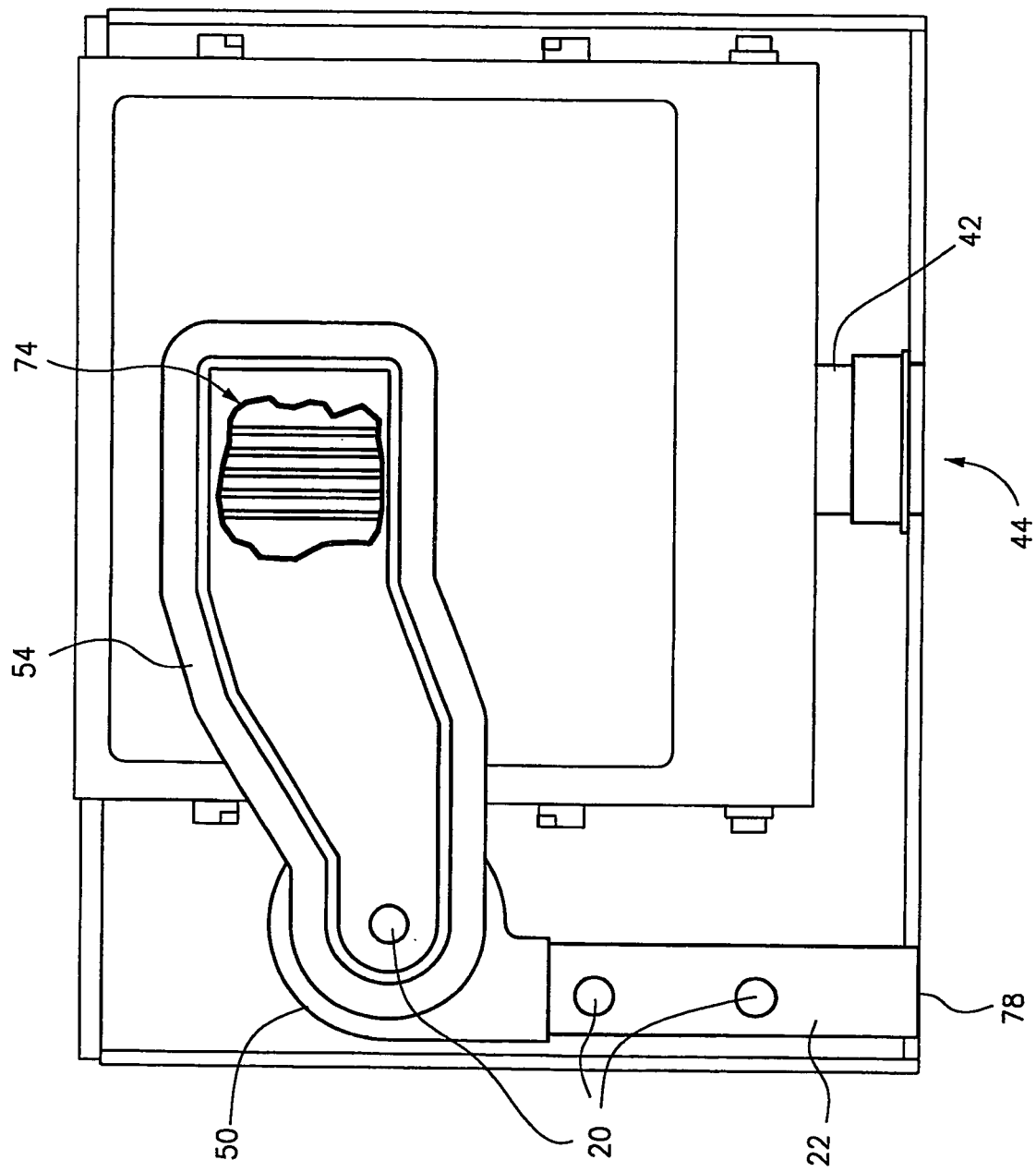
FIG. 4 is a cut-away view taken along line 4-4 of FIG. 1 looking down on the interior of one possible embodiment of the countertop coffee roaster invention.

FIG. 2 also shows cooling duct 42. As best shown in FIGS. 3 and 4, cooling fan 44 and cooling duct 42 are positioned to direct cool ambient air at the beans 40 to cool the beans rapidly at the conclusion of the roasting process.

FIG. 2 also shows a portion of the exhaust system including exhaust duct 22, exhaust fan chamber 50, exhaust fan motor 52 and exhaust collection duct 54. The exhaust system has several components. The basic function of the exhaust system is to collect hot air, smoke, and other gases that are generated during the roasting process, minimize the amount of smoke emitted by the roaster, and cool the exhaust to a temperature that is acceptable to vent from the roaster. As shown in FIGS. 3 and 4, exhaust collection duct 54 connects the roasting chamber with exhaust fan chamber 50 and exhaust duct 22. As shown in FIG. 4, secondary heating elements 74 are positioned in chamber 56 (shown in FIG. 3) of exhaust collection duct 54. Exhaust fan 72 (shown in FIG. 5) is located in exhaust fan chamber 50 and draws air from the roasting chamber, through secondary heating elements 74, down exhaust collection duct 54, through fan chamber 50, down exhaust duct 22, and out exhaust port 78. Preferably, the opening leading from the roasting chamber to exhaust collection duct 54 is positioned to draw exhaust gases evenly from the entire length of the roasting chamber. Positioning the exhaust duct in a manner whereby exhaust gases are drawn more from one side of the roasting chamber than another leads to beans being roasted to a greater degree on one side than the other.

Secondary heating elements 74 may be made of heating filaments or any other suitable material. When heated to at least 300° C. and preferably over 350° C., the amount of smoke emitted in the exhaust from the roaster is dramatically reduced.

Figure 5:
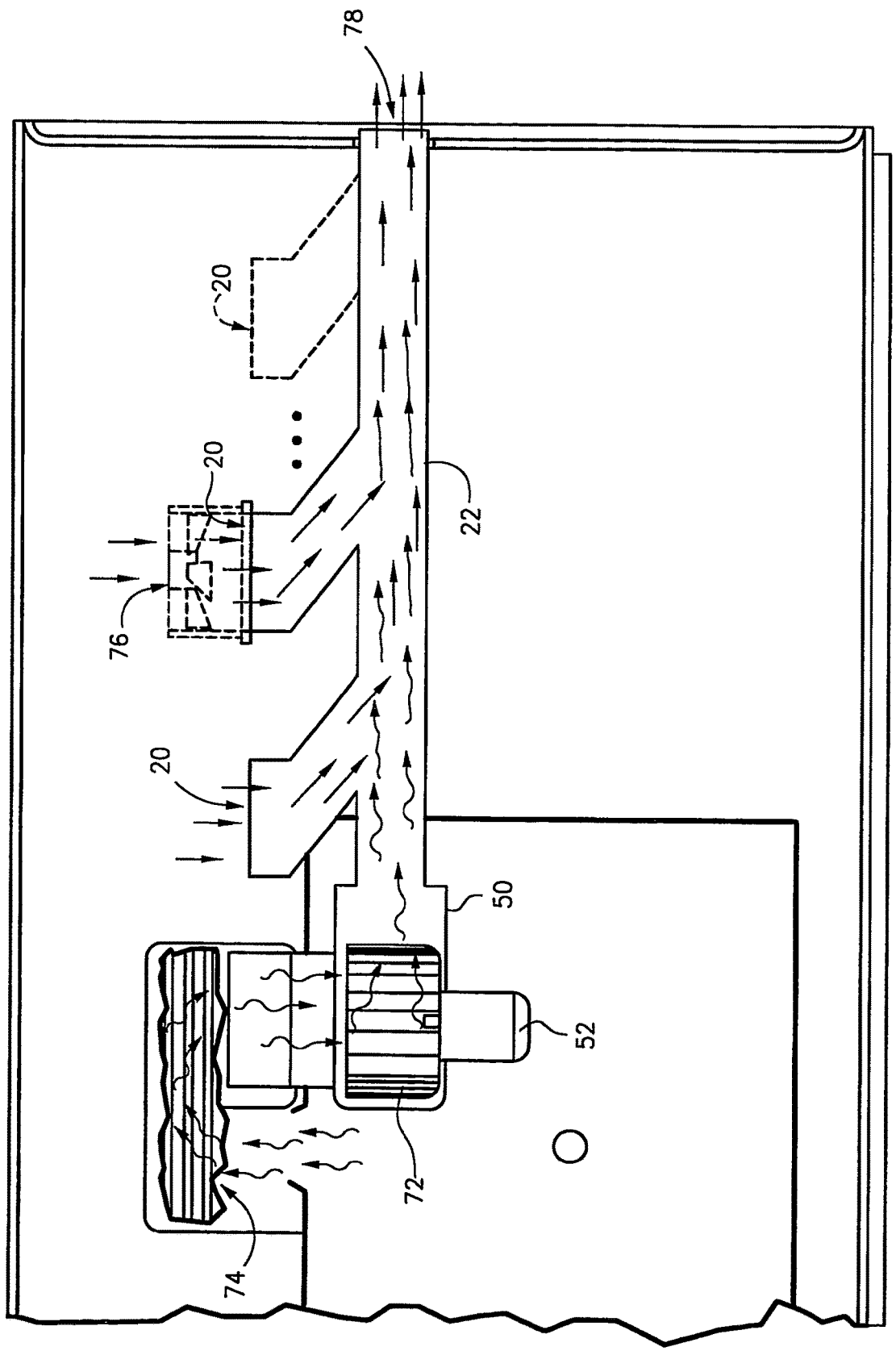
FIG. 5 is a detail view showing one possible embodiment of the exhaust system of one possible embodiment of the countertop coffee roaster invention.

If desired, exhaust duct vents 70 (shown in FIGS. 4 and 5) may be incorporated in exhaust duct 22 and fan chamber 50. Exhaust duct vents 20 draw in ambient air which mixes with the hot exhaust gases, cooling the exhaust to a temperature at which the exhaust gases may be safely expelled through exhaust port 78. Exhaust duct vents 20 may simply be openings in exhaust duct 22, as shown in FIG. 4, or they may be shaped to minimize any airflow out of exhaust duct vents 20 as shown in FIG. 5. If desired, one or more fans designated generally as 76 may be located at the opening of exhaust duct vents 20 or inside exhaust duct vents 20 as shown in FIG. 5.

All of the functions of the coffee roaster 10 may be controlled by appropriate circuitry (not shown) that is commonly known in the art. A user interfaces with such circuitry through a control panel designated generally as 16 (Shown in FIGS. 2 and 3). The control panel may consist of any user interface commonly known in the art such as dials, switches, knobs (as shown in FIG. 2), digital keypads or touch pads (as shown in FIG. 3). The control circuitry may allow for the activation of various features of the invention independent of the whether other features are active or not. For example but without limitation, the control circuitry may allow heating elements 32 to be activated independent of any other functions for baking. Alternatively, the control circuitry may allow heating elements 32 and 34 to be activated together for toasting.

Alternatively, it may be desirable to link certain features of the invention. For example but without limitation, the circuitry may allow a user, with the single push of a button, to activate (i) the rotation of drum 12; (ii) the heating of elements 30; (iii) the operation of exhaust fan 72; and (iv) the heating of secondary heating elements 74, all at the same time for coffee roasting.

The circuitry may incorporate timing and control mechanisms to turn on or off and time the length of operation of any aspect of the invention. For example, but without limitation, the circuitry may be preprogrammed for common roasting cycles such as one pound of beans roasted to a medium roast. Such a cycle may include, without limitation, the activation of (i) the rotation of drum 12; (ii) the heating of elements 30; (iii) the operation of exhaust fan 72; and (iv) the heating of secondary heating elements 74, all at the same time for coffee roasting.

Fifteen minutes later, for example, the circuitry may turn off heating elements 30 and may activate cooling fan 44 to cool the beans. Fifteen minutes later, for example, the circuitry may turn off all components of the coffee roaster and signal completion of the roasting cycle by audio and/or visual means.

One reasonably skilled in the art will appreciate that many different permutations and combinations of control circuitry are possible to correspond to the many different functions that may be performed by the coffee roaster.

Although the invention has now been described in terms of certain preferred embodiments and exemplified with respect thereto, one skilled in the art can readily appreciate that various additions, modifications, changes, omissions and substitutions may be made without departing from the spirit thereof. It is intended therefore that the present invention be limited solely by the scope of the following claims.

The invention claimed is:

1. A countertop home appliance and coffee roaster comprising:
    a roasting chamber adapted to receive a bean container;
    a bean container for holding coffee beans and adapted to fit within said roasting chamber;
    at least one primary heating element positioned within said roasting chamber proximate to said bean container and positioned to roast coffee beans in said bean container by radiant heat;
    at least one exhaust duct connected to said roasting chamber and adapted to vent exhaust gases from said roasting chamber; and
    at least one secondary heating element positioned within said at least one exhaust duct.

2. The countertop home appliance and coffee roaster of claim 1 wherein at least one of said at least one exhaust duct defines at least one exhaust duct vent adapted to facilitate the mixing of exhaust gases with ambient air prior to venting said exhaust gases.

3. The countertop home appliance and coffee roaster of claim 2 wherein at least one of said at least one exhaust duct vent is configured to minimize the tendency of exhaust gases to exit the exhaust duct through said at least one of said at least one exhaust duct vent.

4. The countertop home appliance and coffee roaster of claim 2 further comprising at least one fan positioned to drive ambient air into at least one of said at least one exhaust duct vent.

5. A countertop home appliance and coffee roaster comprising: a roasting chamber adapted to contain a bean container;
    a bean container for holding coffee beans and adapted to fit within said roasting chamber;
    at least one primary healing element positioned within said roasting chamber proximate to said bean container and positioned to roast coffee beans in said bean container by radiant heat;
    an interior surface of said roasting chamber defining at least one opening through which hot air, smoke or other effluent generated during a roasting process may pass out of said roasting chamber; and
    at least one secondary heating element positioned proximate to at least one of said at least one opening in said interior surface of said roasting chamber.

6. A countertop home appliance and coffee roaster comprising: a roasting chamber adapted to contain a bean container;
- a bean container for holding coffee beans and adapted to fit within said roasting chamber;
- at least one primary healing element positioned within said roasting chamber proximate to said bean container and positioned to roast coffee beans in said bean container by radiant heat;
- an interior surface of said roasting chamber defining at least one opening through which hot air, smoke or other effluent generated during a roasting process may pass out of said roasting chamber;
- at least one passageway with at least one end connected to at least one of said at least one opening in said interior surface of said roasting chamber and at least one second end not connected to any of said at least one opening in said interior surface of said roasting chamber; and
- at least one secondary heating element positioned within said passageway.

7. The countertop home appliance and coffee roaster of claim 6 further comprising at least one exhaust fan positioned within at least one of said at least one passageway to draw hot air, smoke or other effluent generated during a roasting process out of said roasting chamber and into said at least one passageway when said exhaust fan is operating.

8. The countertop home appliance and coffee roaster of claim 7 wherein said passageway defines at least one exhaust fan chamber adapted to contain at least one of said at least one exhaust fan; and
- wherein at least one of said at least one exhaust fan is positioned within at least one of said at least one exhaust fan chamber.

9. The countertop home appliance and coffee roaster of claim 6 wherein at least one of said at least one passageway defines at least one opening to facilitate the mixing of ambient air with hot air, smoke or other effluent generated during a roasting process and passing through said passageway prior to venting said exhaust gases.

10. The countertop home appliance and coffee roaster of claim 9 further comprising at least one structure located proximate at least one of said at least one opening and shaped to minimize airflow out of said passageway.

11. The countertop home appliance and coffee roaster of claim 9 further comprising at least one fan positioned proximate at least one of said at least one opening and further positioned to direct ambient air into said at least one of said at least one opening.

* * * * *